US010717534B2

(12) United States Patent
Duckert et al.

(10) Patent No.: US 10,717,534 B2
(45) Date of Patent: Jul. 21, 2020

(54) EXTENDABLE SPLIT HEADREST

(71) Applicant: GOODRICH CORPORATION, Charlotte, NC (US)

(72) Inventors: Robert E. Duckert, Coleman, WI (US); Kenneth J Davis, Menominee, MI (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/222,395

(22) Filed: Dec. 17, 2018

(65) Prior Publication Data
US 2020/0189745 A1    Jun. 18, 2020

(51) Int. Cl.
| | |
|---|---|
| *B60N 2/80* | (2018.01) |
| *B60N 2/806* | (2018.01) |
| *B60N 2/809* | (2018.01) |
| *B60N 2/812* | (2018.01) |
| *B60N 2/824* | (2018.01) |
| *B60N 2/832* | (2018.01) |
| *B60N 2/885* | (2018.01) |
| *B64D 11/06* | (2006.01) |

(52) U.S. Cl.
CPC ............ *B64D 11/0642* (2014.12); *B60N 2/80* (2018.02); *B60N 2/806* (2018.02); *B60N 2/809* (2018.02); *B60N 2/812* (2018.02); *B60N 2/824* (2018.02); *B60N 2/832* (2018.02); *B60N 2/885* (2018.02)

(58) Field of Classification Search
CPC .... B64D 11/0642; B60N 2/829; B60N 2/832; B60N 2/874; B60N 2/876

USPC .............................................. 297/284.3, 410
See application file for complete search history.

(56) References Cited

U.S. PATENT DOCUMENTS

| | | | |
|---|---|---|---|
| 2,652,101 A | 9/1953 | Samsky | |
| 3,462,193 A | 8/1969 | Tamura | |
| 5,120,109 A * | 6/1992 | Rangoni | B60N 2/1803 297/284.3 X |
| 5,836,647 A * | 11/1998 | Turman | B60N 2/4228 297/284.3 |
| 5,836,651 A * | 11/1998 | Szerdahelyi | B60N 2/2222 297/410 |
| 6,192,565 B1 * | 2/2001 | Tame | B60N 2/20 297/410 X |
| 6,250,716 B1 * | 6/2001 | Clough | A47C 7/383 297/410 X |
| 6,666,517 B2 * | 12/2003 | Clough | B60N 2/885 297/410 |
| 6,692,071 B2 * | 2/2004 | Fowler | B60N 2/4235 297/216.12 |
| 7,040,705 B2 * | 5/2006 | Clough | A47C 7/38 297/410 |

(Continued)

FOREIGN PATENT DOCUMENTS

WO    1995009742    4/1995

*Primary Examiner* — Rodney B White
(74) *Attorney, Agent, or Firm* — Snell & Wilmer L.L.P.

(57) ABSTRACT

A headrest frame for a seat is disclosed. In various embodiments, the headrest frame includes a main body portion having a stowed length; a top portion configured to assume a stowed position and a deployed position with respect to the main body portion, the deployed position defining a deployed length greater than the stowed length; and a deployment mechanism configured to urge the top portion into the deployed position from the stowed position.

20 Claims, 5 Drawing Sheets

(56) References Cited

U.S. PATENT DOCUMENTS

| | | | | |
|---|---|---|---|---|
| 7,080,886 B2* | 7/2006 | Bauer | A47C 7/38 | |
| | | | 297/410 X | |
| 7,144,083 B2* | 12/2006 | List | B60N 2/885 | |
| | | | 297/391 | |
| 7,201,448 B2 | 4/2007 | Williamson et al. | | |
| 7,264,313 B2* | 9/2007 | Clough | A47C 7/38 | |
| | | | 297/407 | |
| 7,364,239 B2* | 4/2008 | Clough | A47C 7/38 | |
| | | | 297/410 X | |
| 7,500,721 B2* | 3/2009 | Beroth | B60N 2/821 | |
| | | | 297/410 | |
| 7,543,888 B2* | 6/2009 | Kuno | B60N 2/0232 | |
| | | | 297/410 X | |
| 7,547,068 B2* | 6/2009 | Davis | B60N 2/2222 | |
| | | | 297/410 X | |
| 7,686,394 B2* | 3/2010 | Nishikawa | B60N 2/2222 | |
| | | | 297/284.3 X | |
| 7,828,387 B2 | 11/2010 | Yoshizawa | | |
| 7,845,729 B2* | 12/2010 | Yamada | B60N 2/0232 | |
| | | | 297/410 | |
| 7,967,379 B2* | 6/2011 | Walters | A47C 1/023 | |
| | | | 297/284.3 | |
| 8,348,339 B2* | 1/2013 | Onuma | B60N 2/002 | |
| | | | 297/284.3 | |
| 8,573,686 B2* | 11/2013 | Bruck | B60N 2/20 | |
| | | | 297/61 | |
| 8,696,065 B2* | 4/2014 | Udriste | B64D 11/06 | |
| | | | 297/409 | |
| 8,894,142 B2* | 11/2014 | Alexander | B60N 2/876 | |
| | | | 297/410 X | |
| 8,911,020 B2 | 12/2014 | Westerink et al. | | |
| 9,028,000 B2* | 5/2015 | Millan | B60N 2/24 | |
| | | | 297/410 | |
| 9,102,255 B2* | 8/2015 | Duckert | B60N 2/80 | |
| 9,145,080 B2 | 9/2015 | Mizobata | | |
| 9,393,892 B1* | 7/2016 | Millan | B60N 2/838 | |
| 9,611,041 B2* | 4/2017 | Baker | B64D 11/0642 | |
| 9,783,304 B2* | 10/2017 | Zheng | B60N 2/809 | |
| 10,093,423 B2 | 10/2018 | Uriu et al. | | |
| 10,252,657 B2* | 4/2019 | Lessard | B60N 2/885 | |
| 10,266,271 B2* | 4/2019 | Udriste | B60N 2/995 | |
| 10,336,230 B2* | 7/2019 | Novin | F16C 11/103 | |
| 10,450,070 B2* | 10/2019 | Beroth | B64D 11/0648 | |
| 2006/0186719 A1* | 8/2006 | Davis | B60N 2/809 | |
| | | | 297/353 | |
| 2012/0080927 A1* | 4/2012 | Lohmann | B60N 2/3009 | |
| | | | 297/410 | |
| 2017/0152049 A1* | 6/2017 | Iossifidis | B64D 11/0642 | |
| 2017/0197529 A1* | 7/2017 | Hontz | B64D 11/0646 | |
| 2020/0010199 A1* | 1/2020 | Ferguson | B64D 11/0642 | |

* cited by examiner

EXTENDABLE SPLIT HEADREST

FIELD

The present disclosure relates to aircraft interiors and, more particularly, to headrest assemblies configured for selective adjustment of seatback length.

BACKGROUND

Various seating assemblies for commercial aircraft include an adjustable headrest designed for head and neck support and personal comfort for an occupant seated thereon. As such, the adjustable headrest may be selectively moved up and down to adjust for the sitting height and comfort of the occupant. Such seats may, however, be subject to various regulations and specifications, including, for example, the regulations set forth in 14 Code of Federal Regulations (C.F.R.) Parts 23, 25 and 121 and the specifications set forth in Technical Standards Order (TSO)-C39. With regard to aft-facing seats, for example, TCO-C39 specifies the design and construction of the seatback be sufficient to provide 36.5 inches (≅92.7 cm) of support for the occupant, as measured from the point of maximum seat cushion depression to the top of the seatback. Accordingly, apparatus and methods for satisfying such regulations and specifications are applicable to seating assemblies for flight attendants in both small and large commercial aircraft and for aft-facing seats in small aircraft with limited cabin space, such as corporate or business-style aircraft.

SUMMARY

A headrest frame for a seat is disclosed. In various embodiments, the headrest frame includes a main body portion having a stowed length; a top portion configured to assume a stowed position and a deployed position with respect to the main body portion, the deployed position defining a deployed length greater than the stowed length; and a deployment mechanism configured to urge the top portion into the deployed position from the stowed position.

In various embodiments, the deployment mechanism includes a bias member configured to bias the top portion into the deployed position. In various embodiments, the bias member is configured to urge the top portion outward from an interior portion of the main body portion. In various embodiments, the bias member is a coil spring having a first end connected to the main body portion and a second end connected to the top portion. In various embodiments, the deployment mechanism includes a strut extending between a lower section of the main body portion and an upper section of the main body portion and the top portion is configured to slide along the strut. In various embodiments, the coil spring is disposed about the strut.

In various embodiments, a lock mechanism is configured to lock the top portion in the stowed position. In various embodiments, the main body portion includes an interior portion and the lock mechanism is configured to lock the top portion inside the interior portion against a force of a bias member. In various embodiments, the interior portion includes a strut extending between a lower section of the main body portion and an upper section of the main body portion and the top portion is configured to slide along the strut. In various embodiments, the top portion includes a bar member configured to slide along the strut and wherein the lock mechanism is configured to releasably engage the bar member. In various embodiments, the bar member is configured to translate between the stowed position and the deployed position by sliding along the strut, bottoming out against the lock mechanism and topping out against the upper section of the main body portion.

An aircraft seat is disclosed. In various embodiments, the aircraft seat includes a seatback; and a headrest frame slidably connected to the seatback, the headrest frame including a main body portion, a top portion configured to assume a stowed position and a deployed position with respect to the main body portion, and a deployment mechanism configured to urge the top portion into the deployed position from the stowed position.

In various embodiments, the deployment mechanism includes a bias member configured to bias the top portion into the deployed position. In various embodiments, the bias member is configured to urge the top portion outward from an interior portion of the main body portion. In various embodiments, a lock mechanism is configured to lock the top portion in the stowed position. In various embodiments, the lock mechanism is configured to lock the top portion inside the interior portion against a force of the bias member. In various embodiments, the bias member is a coil spring having a first end connected to the main body portion and a second end connected to the top portion.

A method of adjusting a length of a seatback is disclosed. In various embodiments, the method comprises the steps of urging a headrest frame into an extended position with respect to the seatback, the extended position defining a first seatback length; and deploying a top portion of the headrest frame from a stowed position to a deployed position with respect to the headrest frame, the deployed position defining a second seatback length greater than the first seatback length.

In various embodiments, the headrest frame includes a deployment mechanism configured to urge the top portion into the deployed position from the stowed position. In various embodiments, the headrest frame includes a lock mechanism configured to lock the top portion in the stowed position.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined. As used herein, "proximal" or "proximate" refer to a direction inward, or generally, towards the reference component.

Figure 1A:
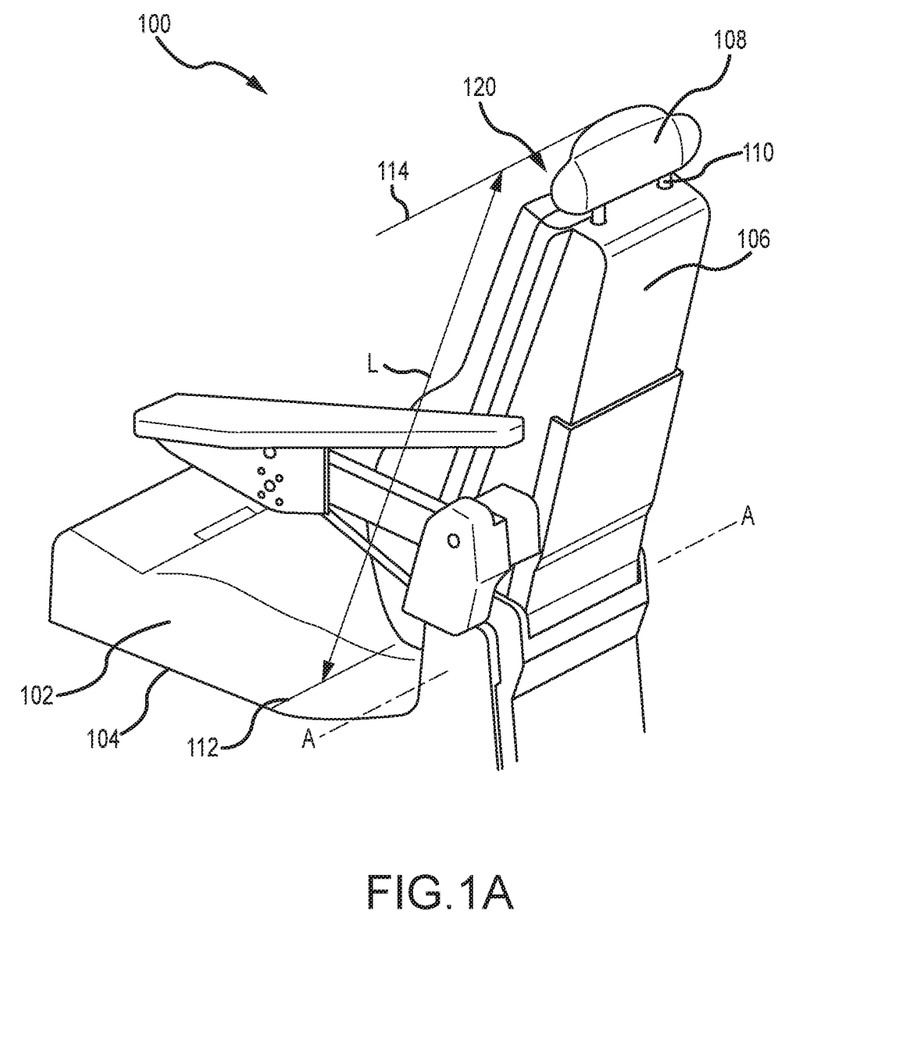
FIG. 1A is a perspective view of a seat with a headrest, in accordance with various embodiment.

Referring now to the drawings, FIG. 1A illustrates an aircraft seat 100, in accordance with various embodiments. The aircraft seat 100 includes a seat portion 102 positioned on a seat pan 104, a seatback 106 and a headrest 108. The seat portion 102 (together with the seat pan 104) is pivotally coupled to the seatback 106 at an axis A, which enables the seatback 106 to selectively pivot forward and back with respect to the seat portion 102 about the axis A. In various embodiments, the headrest 108 is slidably connected to the seatback 106 via one or more headrest tubes 110. The headrest 108 includes a headrest frame 120 (see FIG. 1B) that, in various embodiments, may be padded with foam and upholstered with a leather or cloth covering, similar to that used to upholster the rest of the aircraft seat 100. In various embodiments, the one or more headrest tubes 110 are selectively received in the seatback 106 through a plurality of conformally shaped holes aligned along the body of the seatback 106. The headrest 108 may be selectively raised or lowered with respect to the seatback 106 via the one or more headrest tubes 110. In various embodiments, a seatback length, L, may be defined as the distance, running substantially longitudinally along the seatback 106, from a back portion 112 of the seat pan 104 to the top of the headrest 108 (or to a headrest top 114). Although the headrest 108 is illustrated being used with the aircraft seat 100, the disclosure contemplates use of the headrest 108 on other seats, such as, for example, automobile seats or train seats, where the headrest 108 may be selectively raised or lowered in order to comport with the sitting height desires of a person occupying the seat or with applicable regulations specifying minimum or maximum dimensions concerning the height of the seat or, for example, the seatback length, L, as defined above.

Figure 1B:
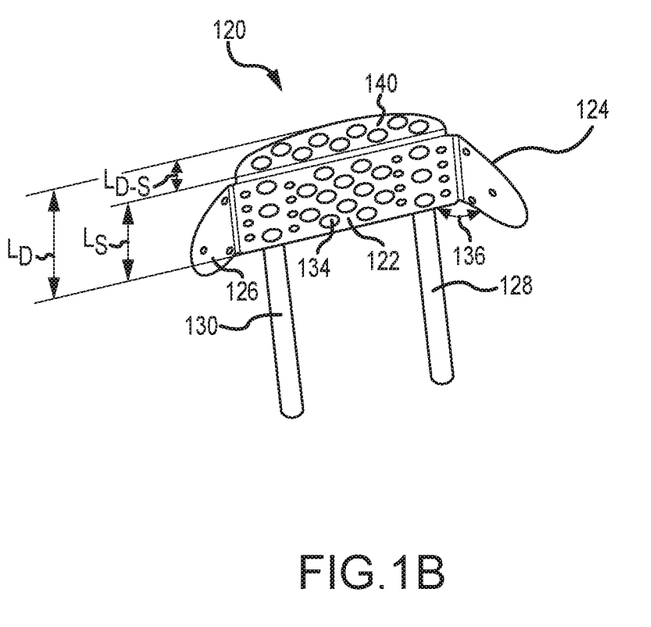
FIG. 1B is a perspective view of a headrest frame, in accordance with various embodiments.

Referring now to FIG. 1B (with continued reference to FIG. 1A), the headrest frame 120 for use in the headrest 108 is illustrated, in accordance with various embodiments, without the padding or upholstery that is shown in FIG. 1A. The headrest frame 120 may include a left wing portion 124 (or a first wing portion) and a right wing portion 126 (or second wing portion) that extend outwardly from a main body portion 122. A left headrest tube 128 (or first headrest tube) and a right headrest tube 130 (or second headrest tube), similar to the one or more headrest tubes described above with reference to FIG. 1A, extend from the main body portion 122 and are configured to slidably connect with the seatback 106.

The main body portion 122, the left wing portion 124 and the right wing portion 126 may be formed from a generally unitary (or one-piece) metal sheet. The left wing portion 124 and the right wing portion 126 may be formed during assembly by bending the unitary metal sheet from the main body portion 122. In various embodiments, the portion just described may be made of aluminum or an aluminum alloy, but other suitable materials may also be used. The main body portion 122 is generally planar and may include a plurality of substantially similar through-holes 134 stamped out from the main body portion 122. The left wing portion 124 and the right wing portion 126 extend laterally from the main body portion 122 and may be tapered at an angle 136 with respect to the main body portion 122. In various embodiments, the left wing portion 124 and the right wing portion 126 are resilient and configured to flex when a force—e.g., a force applied by the head of an occupant of the aircraft seat 100—is applied to deflect each of the left wing portion 124 and the right wing portion 126 away from or toward the main body portion 122.

As will be described in more detail below, the headrest frame 120 further includes a top portion 140. In various embodiments, the top portion 140 is configured for slidable engagement with the main body portion 122 such that in a stowed position (or first position), the top portion 140 is disposed within an interior of the main body portion 122, and in a deployed position (or second position), the top portion 140 extends outwardly from the interior of the main body portion 122. Configured as such, the deployed position provides for a deployed headrest length, $L_D$, that is longer in length than a stowed headrest length, $L_S$, the difference in length being a delta headrest length, $L_{D-S}$, where $L_{D-S}=L_D-L_S$. In various embodiments, as will be described below, the delta headrest length, $L_{D-S}$, provided by the top portion 140 may provide for a seatback 106, having a seatback length, L, that complies with various applicable regulations or specifications where such would not be the case absent the top portion 140.

Figure 2A:
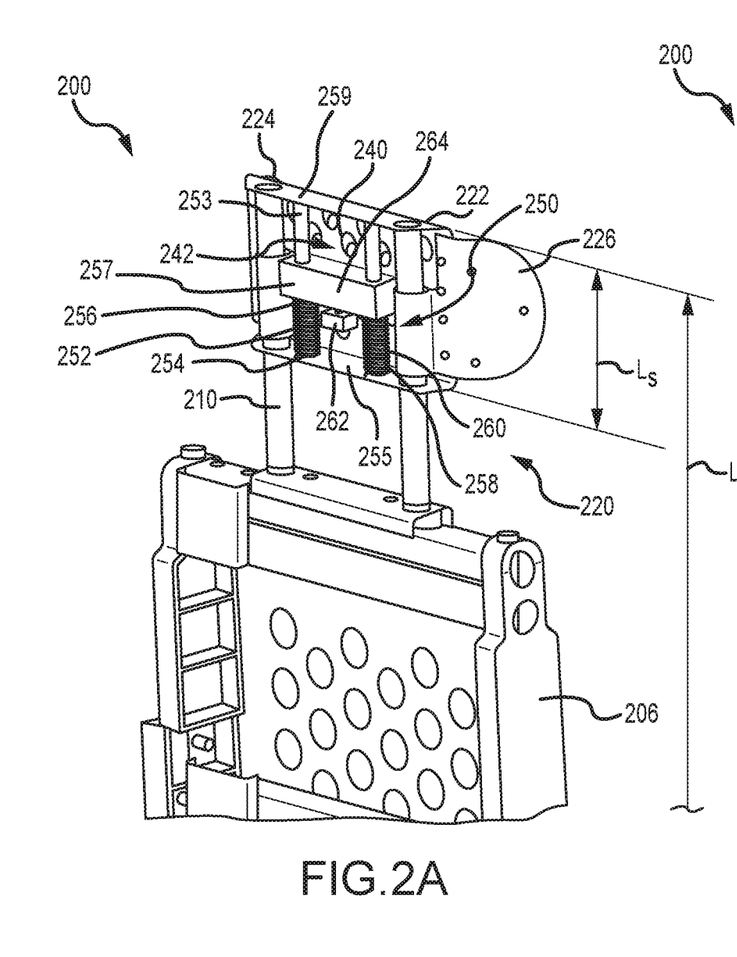
FIGS. 2A and 2B are perspective views of an upper portion of a seat having a headrest, in accordance with various embodiments.
Figure 2B:
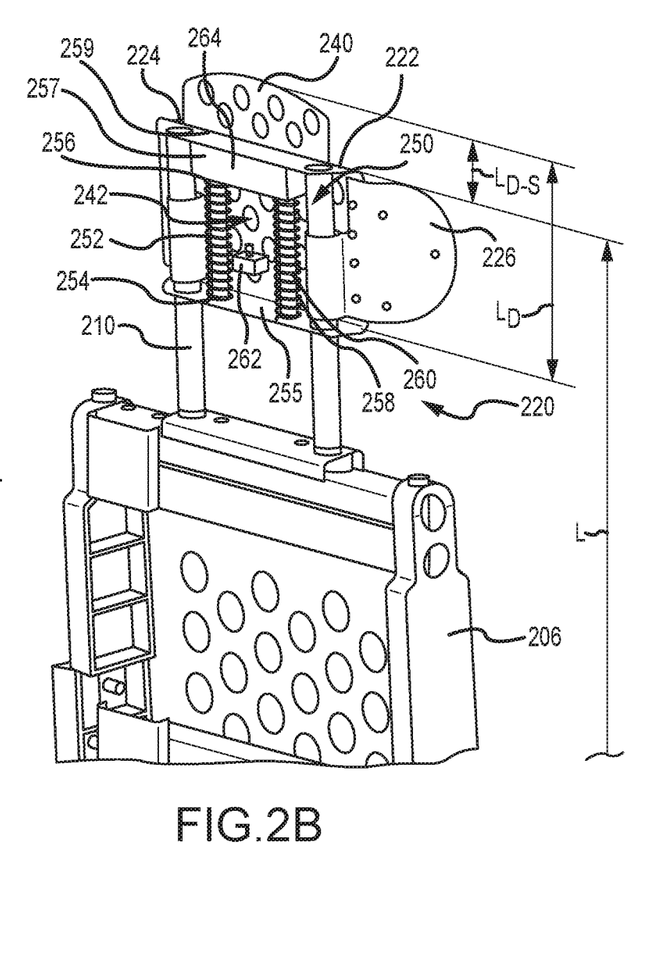

Referring now to FIGS. 2A and 2B, perspective views of an upper portion of a seat 200 are illustrated, in accordance with various embodiments. The seat 200 includes a headrest frame 220, similar to the headrest frame 120 described above with reference to FIG. 1B. In various embodiments, the headrest frame 220 includes a main body portion 222, a left wing portion 224 and a right wing portion 226, each of which share similar structural and operational characteristics as those described above with reference to FIG. 1B. Also similar to the above description, the headrest frame 220 is slidably connected to a seatback 206 via one or more headrest tubes 210, enabling the headrest to adjust a seatback length, L, similar to the seatback length, L, described above with reference to FIG. 1A.

In various embodiments, the headrest frame 220 includes a top portion 240 configured for slidable engagement with the main body portion 222 such that in a stowed position (see FIG. 2A), the top portion 240 is disposed within an interior portion 242 of the main body portion 222, and in a deployed position (see FIG. 2B), the top portion 240 extends outwardly from the interior portion 242 of the main body portion 222. Configured as such, the deployed position provides for a deployed headrest length, $L_D$ (or a deployed length), that is longer in length than a stowed headrest length, $L_S$ (or a stowed length), the difference in length being a delta headrest length, $L_{D-S}$, where $L_{D-S}=L_D-L_S$ (or a length difference). In various embodiments, the delta headrest length. $L_{D-S}$, provided by the top portion 240 assuming the deployed position, may result in the seatback length, L, being in compliance with various applicable regulations or specifications where such would not be the case absent the top portion 240 assuming the deployed position.

Still referring to FIGS. 2A and 2B, a deployment mechanism 250 is described whereby the top portion 240 may be urged into the deployed position from the stowed position. In various embodiments, the deployment mechanism 250 includes a pair of struts 252 (or at least one strut), each having a first end 254 connected to or proximate a lower section 255 (or lower plate) of the main body portion 222 and a second end 253 connected to or proximate an upper section 259 (or upper plate) of the main body portion 222. A bias member 258 such as, for example, a coil spring 260 is disposed between the first end 254 and a lower section 257 of the top portion 240 and is configured to urge the top portion 240 outward from the interior portion 242 of the main body portion 222 and into the deployed position. In addition, a lock mechanism 262 is connected to the main body portion 222 and is configured to lock the top portion 240 into a stowed position when the top portion 240 is urged into the interior portion 242 of the main body portion 222 against the force of the bias member 258. In various embodiments, the lock mechanism 262 is configured to releasably engage a bar member 264 that provides the lower section 257 of the top portion 240 and is configured to translate the top portion 240 between the stowed position and the deployed position. In various embodiments, the bar member 264 translates between the stowed position and the deployed position by sliding along the pair of struts 252, bottoming out against the lock mechanism 262 and topping out against the upper section 259 of the main body portion 222.

Figure 3A:
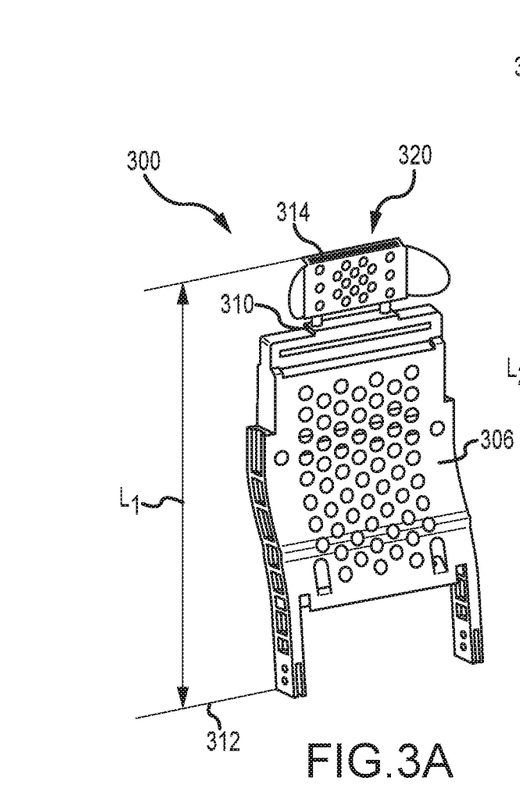
FIGS. 3A, 3B and 3C are perspective views of a seat having a seatback and a headrest frame slidably connected to the seatback, in accordance with various embodiments, and FIG. 4 describes a method of adjusting the length of a seatback.
Figure 3B:
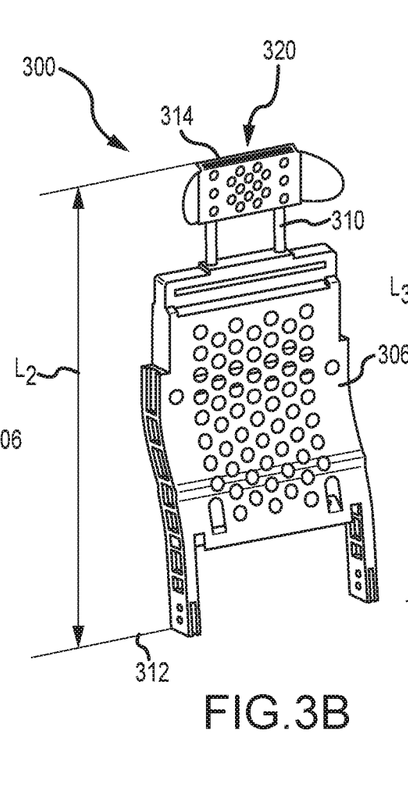
Figure 3C:
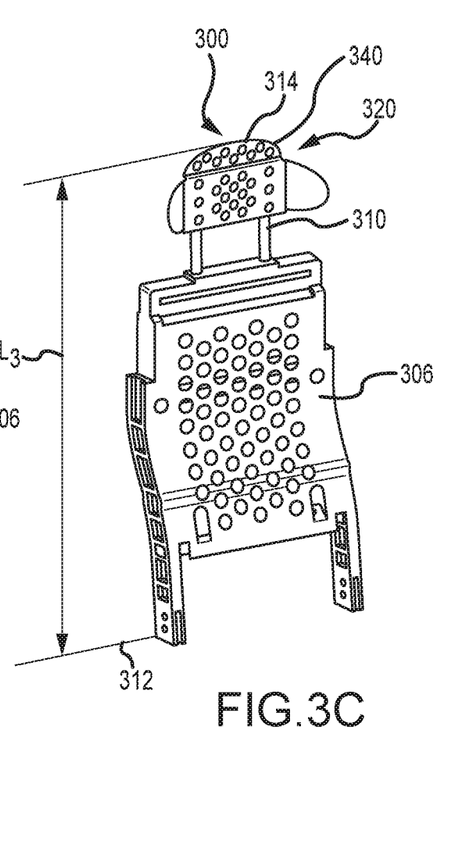

Referring now to FIGS. 3A, 3B and 3C, a seat 300 having a seatback 306 and a headrest frame 320 slidably connected to the seatback 306 via one or more headrest tubes 310 is illustrated in three different stages of elongation of a seatback length, $L_i$, via operation of the headrest frame 320. In various embodiments, the seatback length, $L_i$, is defined similarly to the seatback length, L, described above with reference to FIG. 1A. Referring to FIG. 3A, for example, the seat 300 is illustrated in a first position where the headrest frame 320 is completely stowed within the seatback 306. The first position provides for a first seatback length $L_1$, extending from a back portion 312 of a seat pan (such as, for example, the seat pan 104 described above with reference to FIG. 1A) and running substantially longitudinally along the seatback 306 to a position proximate a headrest top 314. Similarly, referring to FIG. 3B, the seat 300 is illustrated in a second position where the headrest frame 320 is completely deployed from the seatback 306. The second position provides for a second seatback length $L_2$, extending from the back portion 312 of the seat pan and running substantially longitudinally along the seatback 306 to a position proximate the headrest top 314. Finally, referring to FIG. 3C, the seat 300 is illustrated in a third position where the headrest frame 320 is completely deployed from the seatback 306 and a top portion 340 of the headrest frame 320 is completely deployed from the headrest frame 320, similar to the deployment of the top portion 240 from the headrest frame 220 described above with reference to FIGS. 2A and 2B. The third position provides for a third seatback length $L_3$, extending from the back portion 312 of the seat pan and running substantially longitudinally along the seatback 306 to a position proximate the headrest top 314.

In various situations, such as, for example, during use in a corporate or business aircraft, the second seatback length, $L_2$, may not be long enough to comply with applicable regulations specifying minimum dimensions concerning the height of the seat or the seatback length, L, as defined above. In such situations, embodiments having the top portion 340 of the headrest frame 320 described above enable the seatback length to be extended an additional, such as, for example, to the third seatback length, $L_3$. The additional length, which, in various embodiments, is equal to the delta headrest length, $L_{D-S}$, described above with reference to FIGS. 2A and 2B, may be configured to comply with the applicable regulations. At least one benefit of the foregoing disclosure is the seat 300 intended for use in small aircraft may be designed with confined space in mind for use during regular flight or cruise at altitude, but also to conform with applicable regulations during periods of take-off and landing where a longer seatback length may be mandated than is otherwise required during regular flight.

Figure 4:
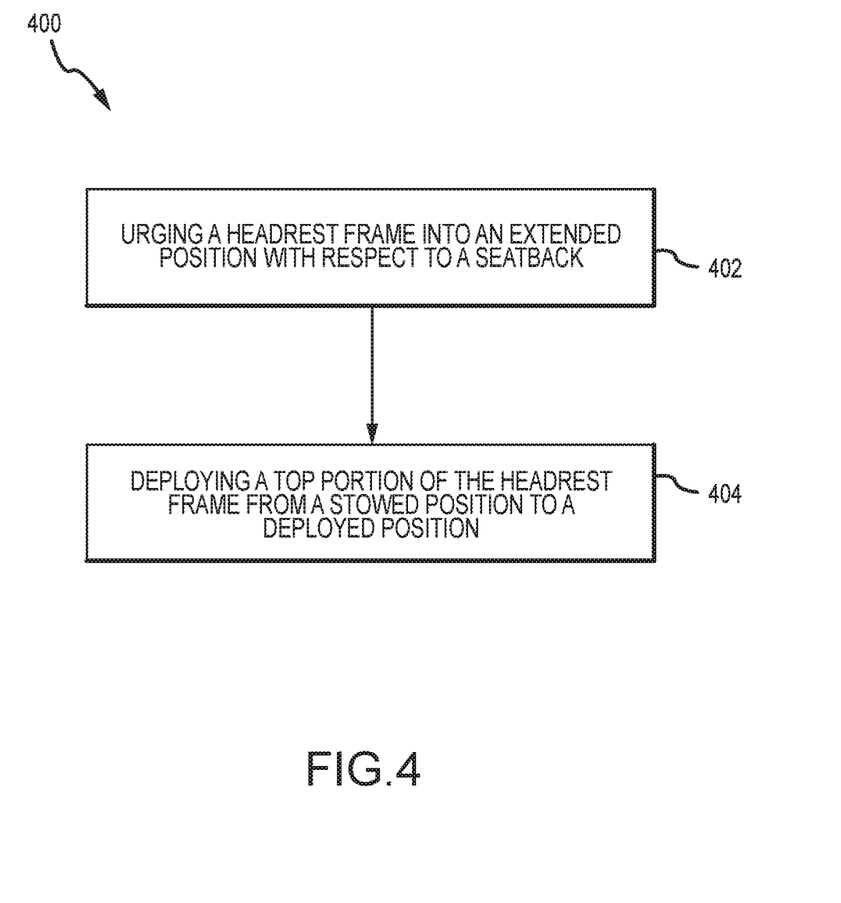

Referring now to FIG. 4, a method 400 of adjusting a length of a seatback is described. In various embodiments, a first step 402 includes urging a headrest frame into an extended position with respect to the seatback, the extended position defining a first seatback length. A second step 404 further includes deploying a top portion of the headrest frame from a stowed position to a deployed position with respect to the headrest frame, the deployed position defining a second seatback length greater than the first seatback length. In various embodiments, the headrest frame includes a deployment mechanism configured to urge the top portion into the deployed position from the stowed position. In various embodiments, the headrest frame further includes a lock mechanism configured to lock the top portion in the stowed position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A headrest frame for a seat, comprising:
   a main body portion having a stowed length, the main body portion configured for slidable connection with a seatback portion of the seat;
   a top portion configured to assume a stowed position, wherein the top portion is disposed within an interior portion of the main body portion, and a deployed position with respect to the main body portion, wherein the top portion extends outwardly from the interior portion of the main body portion, the deployed position defining a deployed length greater than the stowed length; and
   a deployment mechanism configured to urge the top portion into the deployed position from the stowed position.

2. The headrest frame of claim 1, wherein the deployment mechanism includes a bias member configured to bias the top portion into the deployed position.

3. The headrest frame of claim 2, wherein the bias member is configured to urge the top portion outward from the interior portion of the main body portion.

4. The headrest frame of claim 3, wherein the bias member is a coil spring having a first end connected to the main body portion and a second end connected to the top portion.

5. The headrest frame of claim 4, wherein the deployment mechanism includes a strut extending between a lower section of the main body portion and an upper section of the main body portion and the top portion is configured to slide along the strut.

6. The headrest frame of claim 5, wherein the coil spring is disposed about the strut.

7. The headrest frame of claim 1, further comprising a lock mechanism configured to lock the top portion in the stowed position.

8. The headrest frame of claim 7, wherein the lock mechanism is configured to lock the top portion inside the interior portion against a force of a bias member.

9. The headrest frame of claim 8, wherein the interior portion includes a strut extending between a lower section of the main body portion and an upper section of the main body portion and the top portion is configured to slide along the strut.

10. The headrest frame of claim 9, wherein the top portion includes a bar member configured to slide along the strut and wherein the lock mechanism is configured to releasably engage the bar member.

11. The headrest frame of claim 10, wherein the bar member is configured to translate between the stowed position and the deployed position by sliding along the strut, bottoming out against the lock mechanism and topping out against the upper section of the main body portion.

12. An aircraft seat, comprising:
    a seatback; and
    a headrest frame slidably connected to the seatback, the headrest frame including
       a main body portion, the main body portion configured for slidable connection with a seatback portion of the aircraft seat,
       a top portion configured to assume a stowed position, wherein the top portion is disposed within an interior portion of the main body portion, and a deployed position with respect to the main body portion, wherein the top portion extends outwardly from the interior portion of the main body portion, and
       a deployment mechanism configured to urge the top portion into the deployed position from the stowed position.

13. The aircraft seat of claim 12, wherein the deployment mechanism includes a bias member configured to bias the top portion into the deployed position.

14. The aircraft seat of claim 13, wherein the bias member is configured to urge the top portion outward from the interior portion of the main body portion.

15. The aircraft seat of claim 14, further comprising a lock mechanism configured to lock the top portion in the stowed position.

16. The aircraft seat of claim 15, wherein the lock mechanism is configured to lock the top portion inside the interior portion against a force of the bias member.

17. The aircraft seat of claim 16, wherein the bias member is a coil spring having a first end connected to the main body portion and a second end connected to the top portion.

18. A method of adjusting a length of a seatback, comprising: urging a headrest frame having a main body portion configured for slidable connection with the seatback into an extended position with respect to the seatback, the extended position defining a first seatback length; and
    deploying a top portion of the headrest frame from a stowed position, wherein the top portion is disposed within an interior portion of the main body portion, to a deployed position with respect to the main body portion of the headrest frame, wherein the top portion extends outwardly from the interior portion of the main body portion, the deployed position defining a second seatback length greater than the first seatback length.

19. The method of claim 18, wherein the headrest frame includes a deployment mechanism configured to urge the top portion into the deployed position from the stowed position.

20. The method of claim 19, wherein the headrest frame includes a lock mechanism configured to lock the top portion in the stowed position.

* * * * *